(12) United States Patent
Hulvey

(10) Patent No.: US 7,715,794 B2
(45) Date of Patent: May 11, 2010

(54) BLUETOOTH FAST CONNECTION MODE FOR WIRELESS PERIPHERAL DEVICE

(75) Inventor: Robert W. Hulvey, Hermosa Beach, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/841,902

(22) Filed: Aug. 20, 2007

(65) Prior Publication Data

US 2007/0287381 A1 Dec. 13, 2007

Related U.S. Application Data

(63) Continuation of application No. 10/417,940, filed on Apr. 17, 2003, now Pat. No. 7,260,357, which is a continuation-in-part of application No. 10/291,030, filed on Nov. 8, 2002, now Pat. No. 6,985,755.

(60) Provisional application No. 60/373,314, filed on Apr. 17, 2002, provisional application No. 60/399,235, filed on Jul. 29, 2002.

(51) Int. Cl.
*H04B 7/00* (2006.01)

(52) U.S. Cl. .................. 455/41.2; 455/515; 455/73; 455/550.1; 370/328; 370/338; 370/441

(58) Field of Classification Search ............... 455/41.2, 455/41.3, 422.1, 435, 557, 515, 73, 550.1; 370/328, 338, 441
See application file for complete search history.

(56) References Cited

U.S. PATENT DOCUMENTS

| 5,861,822 | A | * | 1/1999 | Park et al. | 341/22 |
|---|---|---|---|---|---|
| 6,622,011 | B1 | * | 9/2003 | Joeressen et al. | 455/88 |
| 2002/0055978 | A1 | * | 5/2002 | Joon-Bo et al. | 709/209 |
| 2002/0071477 | A1 | * | 6/2002 | Orava | 375/132 |
| 2002/0082035 | A1 | * | 6/2002 | Aihara et al. | 455/518 |
| 2005/0060154 | A1 | * | 3/2005 | Kumar | 704/246 |

* cited by examiner

*Primary Examiner*—Tuan A Pham
(74) *Attorney, Agent, or Firm*—Garlick Harrison & Markison; Bruce Garlick; Kevin L. Smith

(57) ABSTRACT

A wireless interface device services communications between a wirelessly enabled host and at least one user input device. The wireless interface device includes a wireless interface unit, a processing unit, an input/output unit, and a power management unit. The wireless interface unit wirelessly interfaces with the wirelessly enabled host using a communication interface protocol. The power management unit couples to the wireless interface unit, the processing unit, and the input/output unit. The wireless interface unit supports paging operations in which the wireless interface device is able to receive a page during a wirelessly enabled host in a page scanning period that corresponds to a duration of the page hopping sequence of the host.

18 Claims, 14 Drawing Sheets

PC host
102 wireless
mouse
104

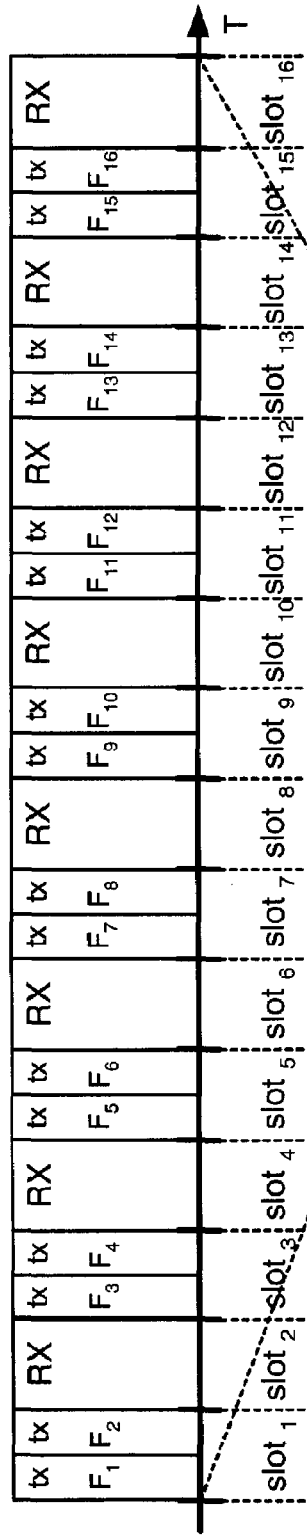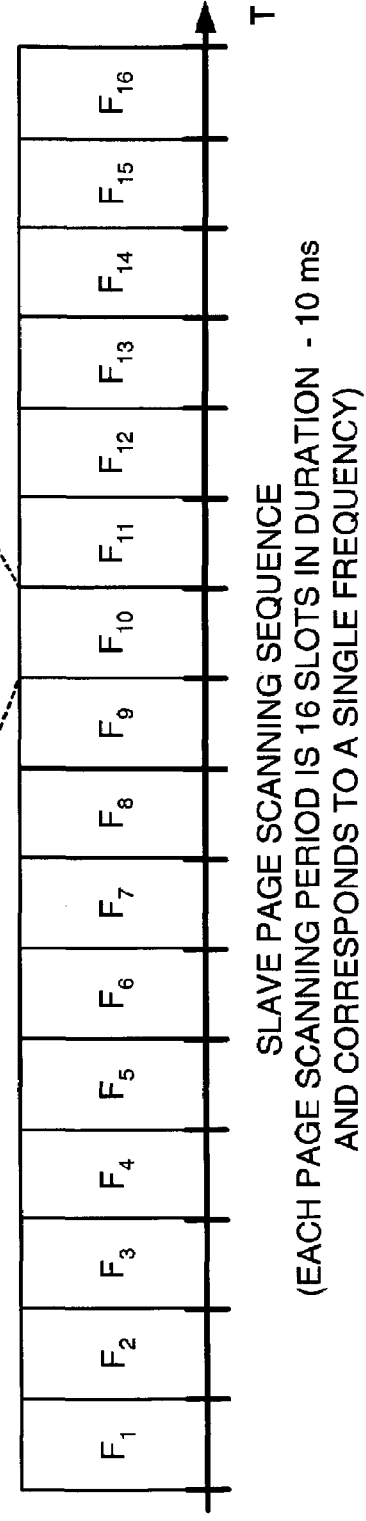
FIG. 12A
FIG. 12B

BLUETOOTH FAST CONNECTION MODE FOR WIRELESS PERIPHERAL DEVICE

CROSS REFERENCE TO RELATED APPLICATION

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. The present U.S. Utility Patent Application claims priority pursuant to 35 U.S.C. §120, as a continuation, to U.S. Utility application Ser. No. 10/417,940, entitled "Bluetooth Fast Connection Mode for Wireless Peripheral Device", filed Apr. 17, 2003, now U.S. Pat. No. 7,260,357, which claims priority pursuant to 35U.S.C. §119(e) to the following U.S. Provisional Patent Applications which are hereby incorporated herein by reference in their entirety and made part of the present U.S. Utility Patent Application for all purposes:
   a. U.S. Provisional Application Ser. No. 60/373,314, entitled "Bluetooth Fast Connection Mode for Wireless Peripheral Device", filed Apr. 17, 2002, expired; and
   b. U.S. Provisional Application Ser. No. 60/399,235, entitled "Reduced Power Consumption Wireless Interface Device", filed Jul. 29, 2002, expired.

U.S. Utility application Ser. No. 10/417,940 claims priority pursuant to 35 U.S.C. §120, as a continuation-in-part (CIP), to U.S. Utility application Ser. No. 10/291,030, entitled "Reduced Power Consumption Wireless Interface Device", filed Nov. 8, 2002, now U.S. Pat. No. 6,985,755 which is hereby incorporated herein by reference in its entirety and made part of the present U.S. Utility Patent Application for all purposes.

TECHNICAL FIELD

This invention relates generally to communication systems and more particularly to radio receivers used within such communication systems.

BACKGROUND

Digital computers have been known in the art for years. Personal digital computers typically include a case, a video display, and one or more input/output devices. The case typically includes a power supply, a cooling fan, a motherboard, interface ports, peripheral cards, a disk drive, and other components. Contained on the motherboard are a processor, memory, a processor chip set, and one or more peripheral buses. The peripheral cards interface input/output devices with the motherboard via the peripheral buses. Other input/output devices may couple directly to the motherboard via appropriate connectors, e.g., devices coupled via a parallel port, devices coupled via a serial port, and devices coupled via a USB.

Input devices receive input from a user or another source while output devices provide output to a user or another destination. Keyboards, computer mice, microphones, scanners, etc. are typically considered input devices because they receive input but provide no output. Monitors, speakers, printers, etc. are considered output devices because they provide output to the user but receive no input from the user. Other devices, such as touch sensitive monitors, that both receive input and produce output are considered to be both input and output devices.

Wireless communication technology has rapidly advanced over the past few years. Resultantly, computer input/output devices are now being called upon to wirelessly communicate with their "host" computers. Wireless keyboards and mice now couple via wireless connections to their host computers. These "wireless" input devices provide great benefits in that they require no wired connections with their host computers. The lack of a wired connection, however, also requires that the wireless input devices contain their own power supply, i.e., that they be battery powered. In order to extend the life of their batteries the wireless input devices often support power saving modes of operation. Unfortunately, none of these power savings modes reduces power consumption to levels that would extend battery life more than a few weeks. Resultantly, the benefits achieved via wireless connectivity is met or exceeded by the repeated chore and expense of frequently changing batteries in the device.

Thus, there is a need in the art for a wireless input device that operates for an extended period on a single battery life but that responds as if it were a wired input device.

SUMMARY

The present invention is directed to apparatus and methods of operation that are further described in the following Brief Description of the Drawings, the Detailed Description of the Drawings, and the claims. Other features and advantages of the present invention will become apparent from the following detailed description of the invention made with reference to the accompanying drawings.

BRIEF DESCRIPTION OF THE DRAWINGS

FIG. 12A is a timing diagram illustrating master paging operations according to the present invention;

FIG. 12B is a timing diagram illustrating slave page operations according to the present invention;

DETAILED DESCRIPTION OF THE DRAWINGS

Figure 1A:
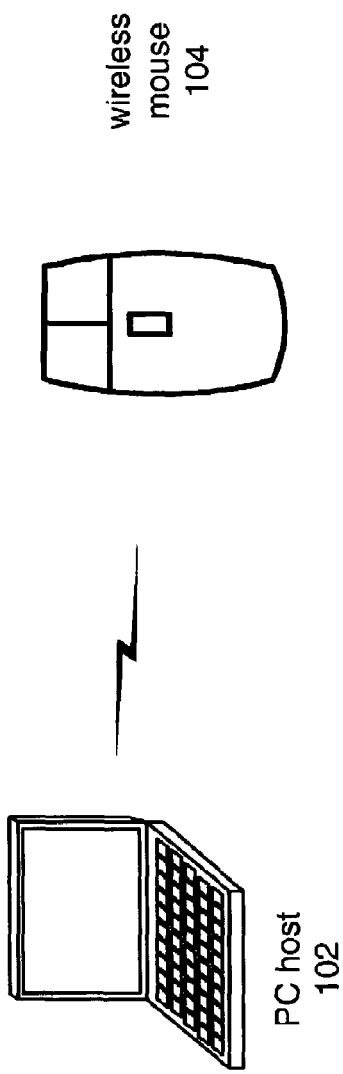
FIG. 1A is a system diagram illustrating a PC host and a wireless mouse that includes a wireless interface device constructed according to the present invention.

The wireless interface device includes a wireless interface unit, a processing unit, an input/output unit, and a power management unit. The wireless interface unit wirelessly interfaces with the wirelessly enabled host using a communication interface protocol. In an embodiment described herein, this communication interface protocol is the Bluetooth communication interface protocol as defined in the "Bluetooth Specification." Other communication protocols, however, could also be employed with the present invention.

The processing unit couples to the wireless interface unit via a system on a chip bus. The input/output unit also couples to the wireless interface unit via the system on a chip bus. The input/output unit also couples to the at least one user input device. In an embodiment described herein, the user input device is a computer mouse and/or a computer keyboard. Each of these input devices receives input from a user and may provide minimal feedback to the user via the lighting of indicator lights.

The power management unit couples to the wireless interface unit, the processing unit, and the input/output unit. The power management unit operates to control the power consumption of the wireless interface device and the processing unit. In performing its power management unit operations, the power management unit enters a power down mode in which it powers down the wireless interface unit and the processing unit. In the power down mode of operation, battery consumption of the wireless interface device is significantly reduced. In the power down operation, however, the input/output unit remains powered such that it can receive input from a coupled user input device. The input/output unit indicates to the power management unit when it receives any user input. When user input is received, the input/output unit notifies the power management unit that activity has commenced. In response, the power management unit powers up the wireless interface unit and the processing units so that the input can be relayed to the wirelessly enabled host.

According to one embodiment in the present invention, the wireless interface device is constructed on a single monolithic integrated circuit. The single monolithic integrated circuit may be contained within a wireless mouse or within a wireless keyboard when installed. The wireless mouse and the wireless keyboard are battery powered such that a single battery or pair of batteries provides all operating voltage for the device. In another embodiment, the mouse is wired to the keyboard and the wireless interface device is contained in the keyboard.

In one embodiment, the monolithic integrated circuit includes a conductive pad ring that is formed near the boundary of the integrated circuit. The wireless interface unit and the processing unit coupled to the conductive pad ring via respective voltage regulation circuitry. A battery providing a voltage source to the integrated circuit is coupled directly to the pad ring. Further, the input/output unit and power management unit are both powered directly from the pad ring. With this structure, the power management unit has control of the voltage regulation circuitry that powers each of the wireless interface unit and the processing unit. During reduced power operations (power down mode), the power management unit powers down the wireless interface unit and the processing unit to significantly reduce power consumption.

According to the operation of the present invention, the wireless interface unit operates substantially in accordance with the Bluetooth Specification. However, upon exiting the power down mode, the wireless interface unit does not operate according to standard page response operations. Instead, the wireless interface unit performs quick scan operations so that it more quickly synchronizes with the servicing master device (host computer) so that it can transmit recently received input to the host computer. In this fashion, even when the wireless interface device is in the power down mode, user input will be presented to the host computer in a relatively expedient fashion.

FIG. 1A is a system diagram illustrating a PC host 102 and a wireless mouse 104 that includes a wireless interface device constructed according to the present invention. As shown in FIG. 1A, the PC host 102 wirelessly couples to the wireless mouse 104. In the structure of FIG. 1A, the wireless mouse 104 includes a wireless interface device that operates to place the wireless mouse in any of a number of reduced power operating modes, including a power down mode in which battery life is substantially extended.

Figure 1B:
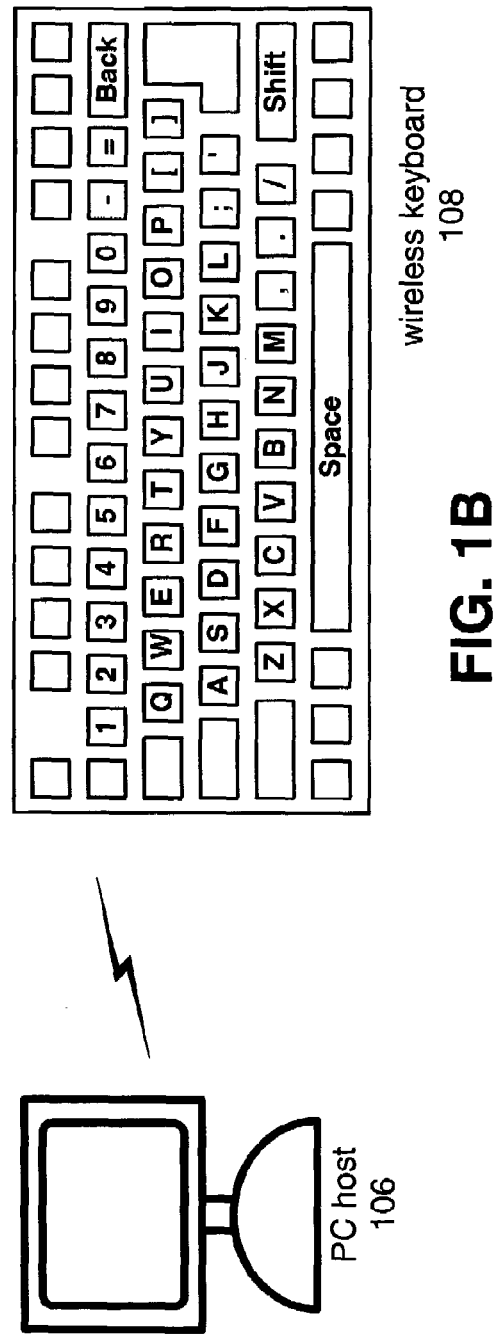
FIG. 1B is a system diagram illustrating a PC host and a wireless keyboard that includes a wireless interface device constructed according to the present invention.

FIG. 1B is a system diagram illustrating a PC host 106 and a wireless keyboard 108 that includes a wireless interface device constructed according to the present invention. The wireless keyboard 108 is battery powered and operates for extended periods on a single set of batteries because of the greatly reduced power consumption operations according to the present invention.

Figure 2:
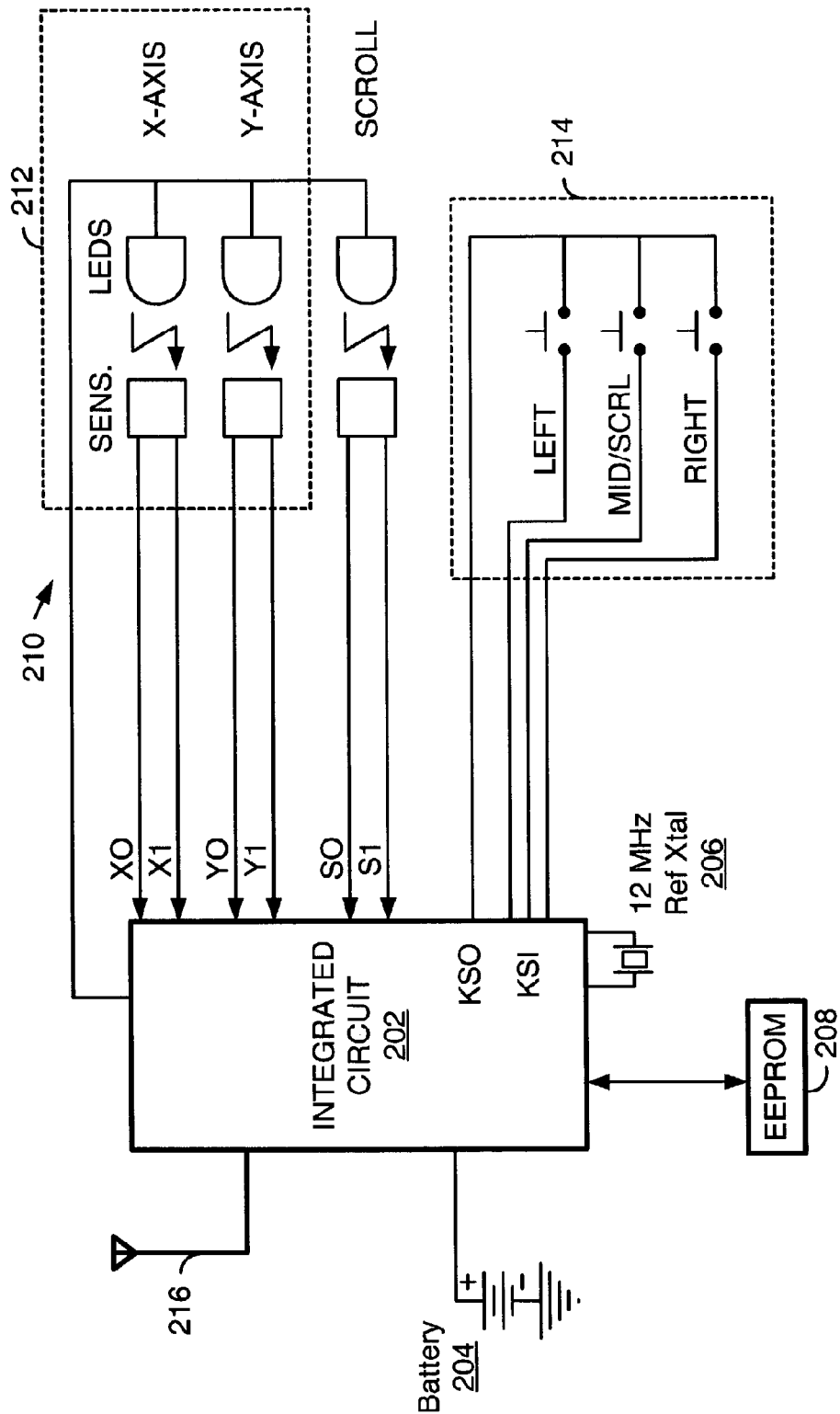
FIG. 2 is a schematic block diagram illustrating the structure of a wireless mouse that includes a wireless interface device constructed according to the present invention.

FIG. 2 is a schematic block diagram illustrating the structure of a wireless mouse that includes a wireless interface device constructed according to the present invention. An integrated circuit 202 constructed according to the present invention serves as the wireless interface device and couples to various mouse inputs 210. These mouse inputs 210 include x-axis and y-axis inputs as well as a scroll input, also known as a z-axis input. The x-axis, y-axis, and z-axis inputs are often implemented as what are referred to as "quadrature" inputs. The components that produce the quadrature inputs are generally referred to at numeral 212 and may be constructed from optical inputs instead of from conventional mechanical inputs. Referenced via numeral 214 are the button inputs that are typical with a computer mouse and include the left button input, the middle/scroll button input, and the right button input. Many mice also include additional buttons with extended functions or programmable functions. As is shown, each of the signals produced by the mouse are received by integrated circuit 202.

Integrated circuit 202 also couples to battery 204, crystal 206 that produces a 12 MHz reference frequency, EEPROM 208, and antenna 216. In one embodiment of the present invention, battery 204 comprises a pair of either AA batteries or AAA batteries. Antenna 216 is an internal antenna in the described because of the size constraints of the mouse and because of the relatively short distance between the PC host and the wireless mouse. In some embodiments, the EEPROM 208 may be replaced by non-volatile storage memory embedded in the integrated circuit 202.

Figure 3:
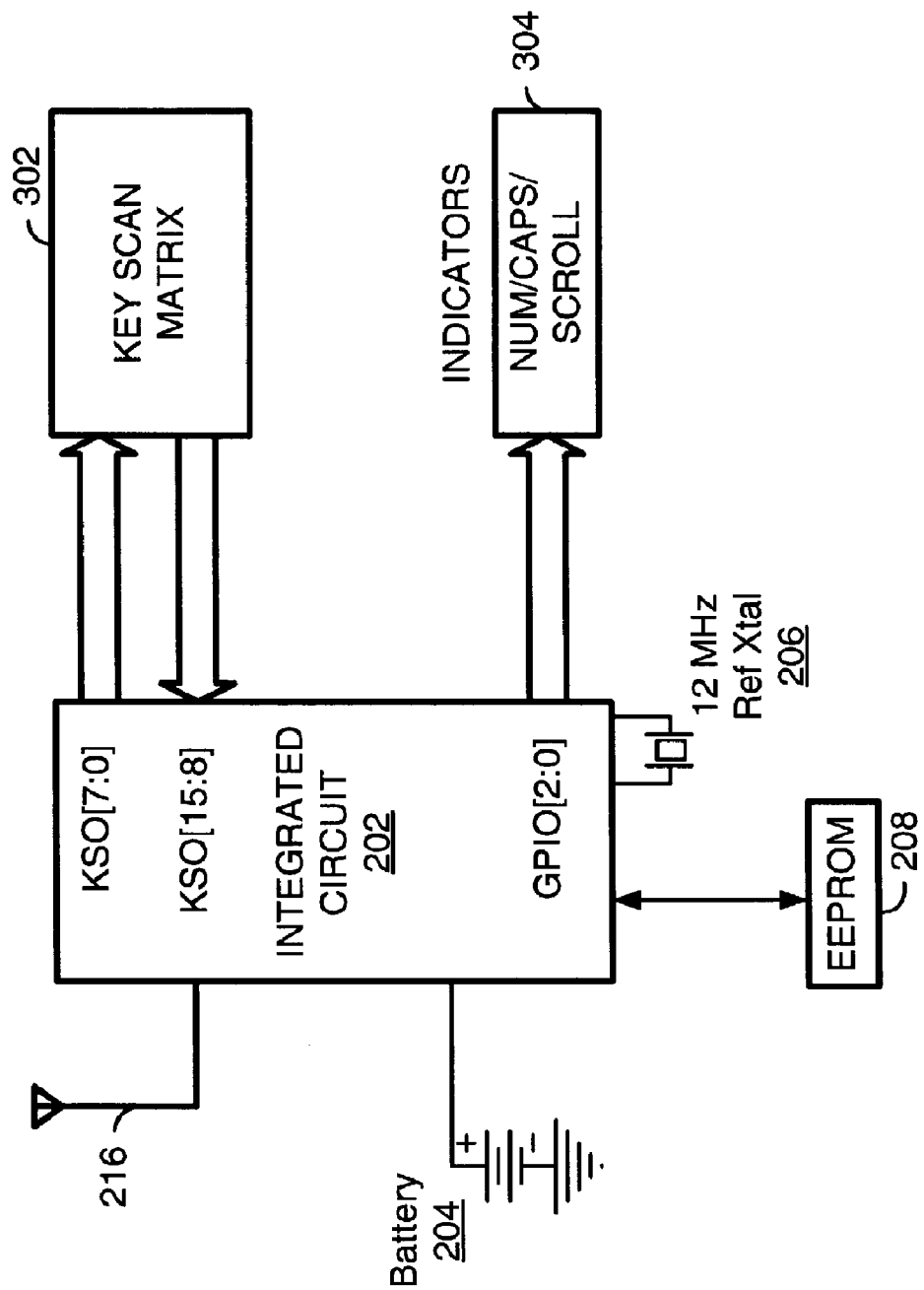
FIG. 3 is a schematic block diagram illustrating the structure of a wireless keyboard that includes a wireless interface device constructed according to the present invention.

FIG. 3 is a schematic block diagram illustrating the structure of a wireless keyboard that includes a wireless interface device (integrated circuit 202) constructed according to the present invention. As shown in FIG. 3, integrated circuit 202 services a key scan matrix 202 that provides inputs from the keyboard. Indicators 304 include number-lock, capitals-lock, and scroll-lock indicator lights that are lit on the keyboard. Most wired keyboards employ LEDs (light emitting diodes) to serve as indicators. However, many wireless keyboards may not include such LEDs due to the power required to light them, or may use alternative indicator means such as an LCD (liquid crystal display) which requires much lower power. The integrated circuit 202 couples to a battery 204, a crystal 206, an EEPROM 208, and an antenna 216.

In another embodiment (not shown in either FIG. 2 or FIG. 3), the integrated circuit 202 services both mouse and keyboard input and may reside internal to either the mouse or the keyboard. As is relatively apparent to the reader, because the input signals differ, multiplexing or signal sharing may be required. However, different signal lines may be dedicated for keyboard and for mouse inputs such that no signal sharing is required. As is apparent, when the integrated circuit 202 alone services both mouse and keyboard input wired connectivity between the keyboard and the mouse is required. The keyboard and mouse input means may in fact reside within the same physical housing.

Figure 4:
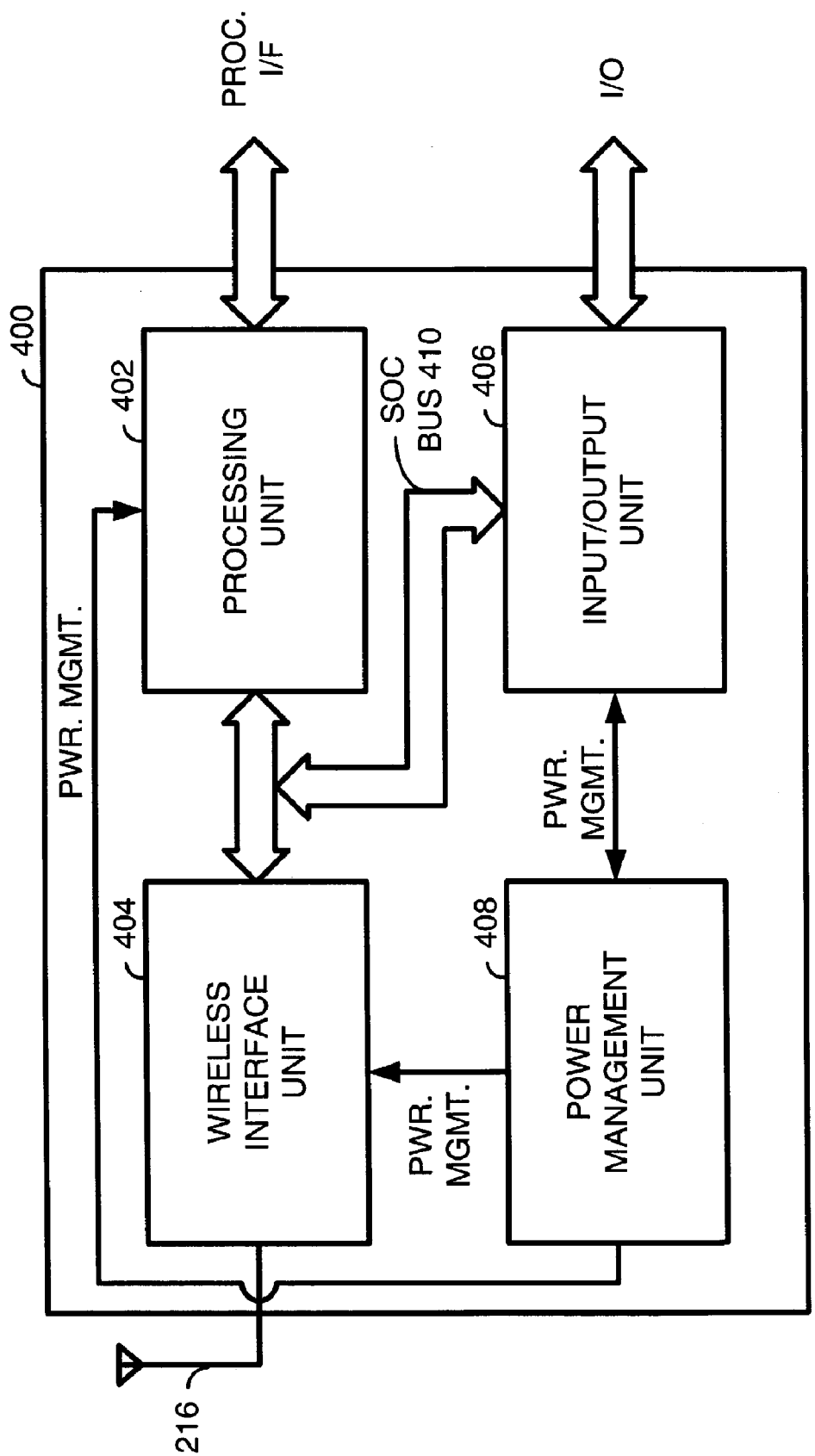
FIG. 4 is a block diagram illustrating a wireless interface device (integrated circuit) constructed according to the present invention.

FIG. 4 is a block diagram illustrating a wireless interface device (integrated circuit) constructed according to the present invention. As shown in FIG. 4, the wireless interface device 400 includes a processing unit 402, a wireless interface unit 404, an input/output unit 406, and a power management unit 408. The wireless interface unit 404 couples the wireless interface device 400 to antenna 216. The wireless interface unit 404 operates according to the Bluetooth specification and in particular to the Human Interface Device (HID) portion of the Bluetooth specification.

Figure 5:
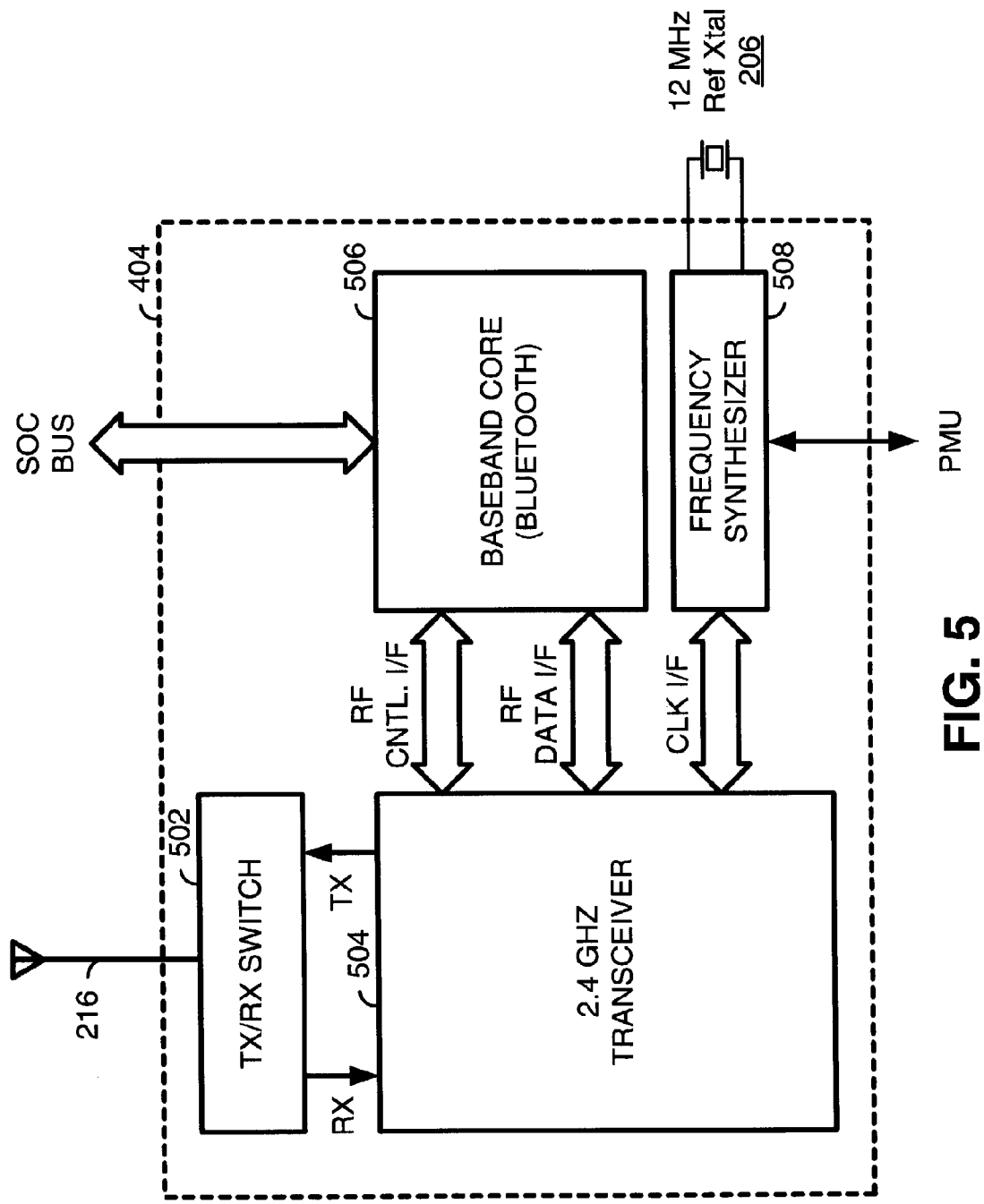
FIG. 5 is a block diagram illustrating a wireless interface unit of the wireless interface device of FIG. 4.

Processing unit 402, wireless interface unit 404, and input/output unit 406 couple with one another via a system on a chip (SOC) bus 410. Processing unit 402 includes a processing interface that may be used to couple the processing unit to one or more devices. Input/output unit 406 includes an input/output set of signal lines that couple the wireless interface device 400 to at least one user input device, e.g., keyboard and/or mouse FIG. 5 is a block diagram illustrating a wireless interface unit of the wireless interface device of FIG. 4. The wireless interface unit 404 includes a transmit/receive switch 502, a 2.4 GHz transceiver 504, a Bluetooth core 506, and a frequency synthesizer 508. Each of these components is generally known in the field and will be described in minimal detail herein.

The transmit/receive switch 502 couples to antenna 216 and switches between transmit and receive operations. The 2.4 GHz transceiver 504 performs all RF front-end operations and operates within a frequency band and on particular channels as are specified by the Bluetooth operating standard. The 2.4 GHz transceiver 504 couples to baseband core 506, which in the present invention is a Bluetooth baseband core. Such coupling is performed via an RF control interface and an RF data interface. The RF control interface performs the necessary control operations to guarantee that the 2.4 GHz transceiver 504 and the baseband core 506 will operate consistently with desired operating specifications. The RF data interface transfers both Rx and TX data between the 2.4 GHz transceiver 504 and the baseband core 506. Frequency synthesizer 508 couples to the power management unit 408, to the external crystal 206 operating at 12 MHz, and to the 2.4 GHz transceiver 504. The frequency synthesizer 508 is controlled to provide an RF frequency for the 2.4 GHz transceiver 504 which is used to mix with the baseband signal received from the baseband core during a transmit operation and to mix with the received RF signal during a receive operation. The baseband core 506 couples to other wireless interface devices via the SOC bus 410.

Figure 6:
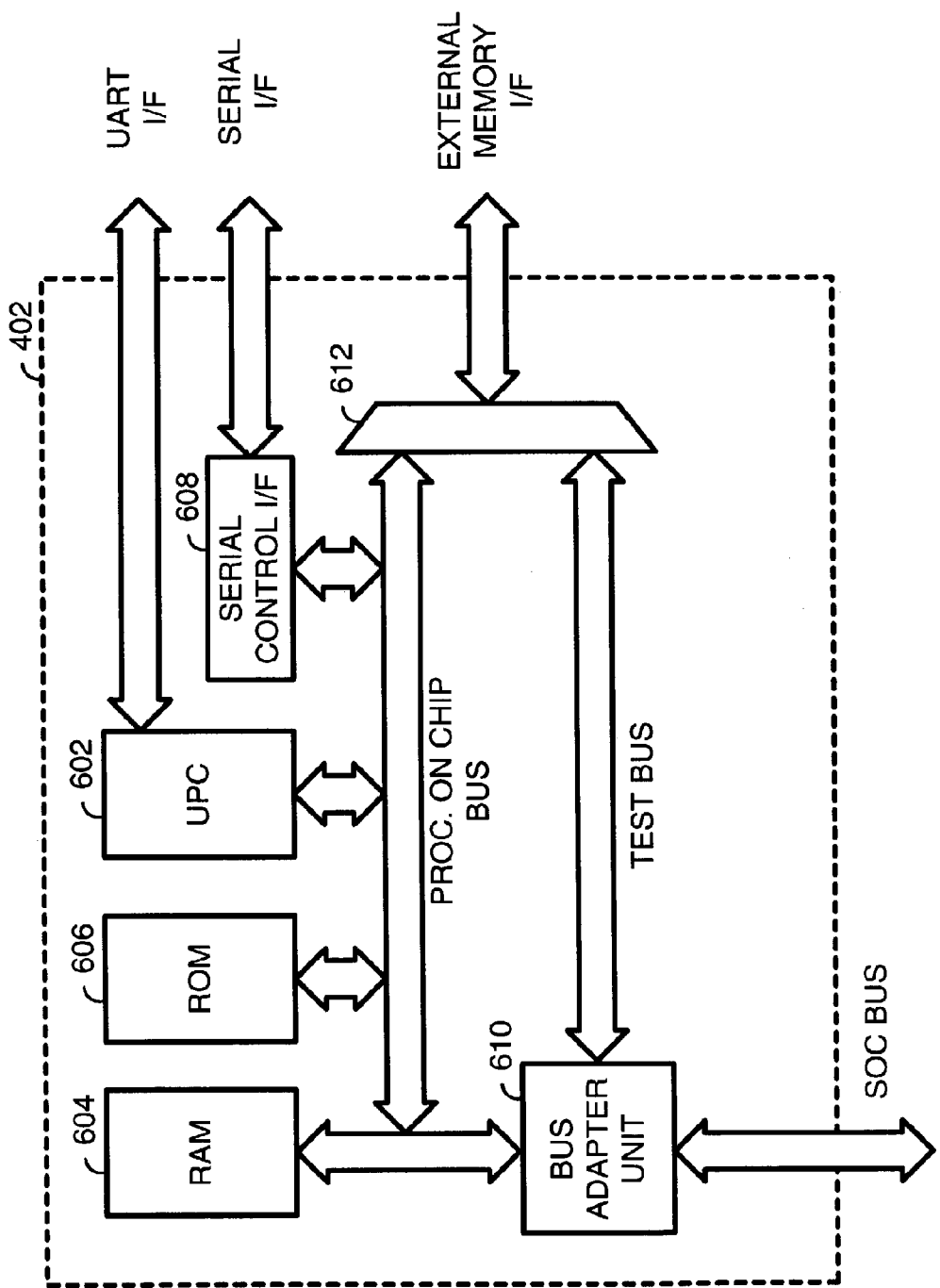
FIG. 6 is a block diagram illustrating a processing unit of the wireless interface device of FIG. 4.

FIG. 6 is a block diagram illustrating a processing unit 402 of the wireless interface device of FIG. 4. The processing unit 402 includes a microprocessor core 602, read only memory 606, random access memory 604, serial control interface 608, bus adapter unit 610, and multiplexer 612. The microprocessor core 602, ROM 606, RAM 604, serial control interface 608, bus adapter unit 610, and multiplexer 612 couple via a processor on a chip bus. Multiplexer 612 multiplexes an external memory interface between the processor on a chip bus and a test bus. The bus adapter unit 610 interfaces the processor on a chip bus with the SOC. The microprocessor core 602 includes a universal asynchronous receiver transmitter interface that allows direct access to the microprocessor core. Further, the serial control interface 608 provides a serial interface path to the processor on a chip bus.

With the processing unit 402 of FIG. 6, the processing unit 402 may service a user input device via the UART interface and/or the serial interface. For example, in one contemplated application, an optical mouse IC will coupled to the processing unit 402 via the UART interface (or the serial interface). In such case, the mouse could be serviced via this interface path instead of via the input/output unit 406 as will be further described with reference to FIGS. 7, 11, and 13.

With the processing unit 402 of FIG. 6, the processing unit 402 may also service a user input device via the external memory interface. For example, in one contemplated application, a keyboard IC will coupled to the processing unit 402 via the external memory interface. In such case, the mouse could be serviced via this interface path instead of via the input/output unit 406 as will be further described with reference to FIGS. 7, 11, and 13.

Figure 7:
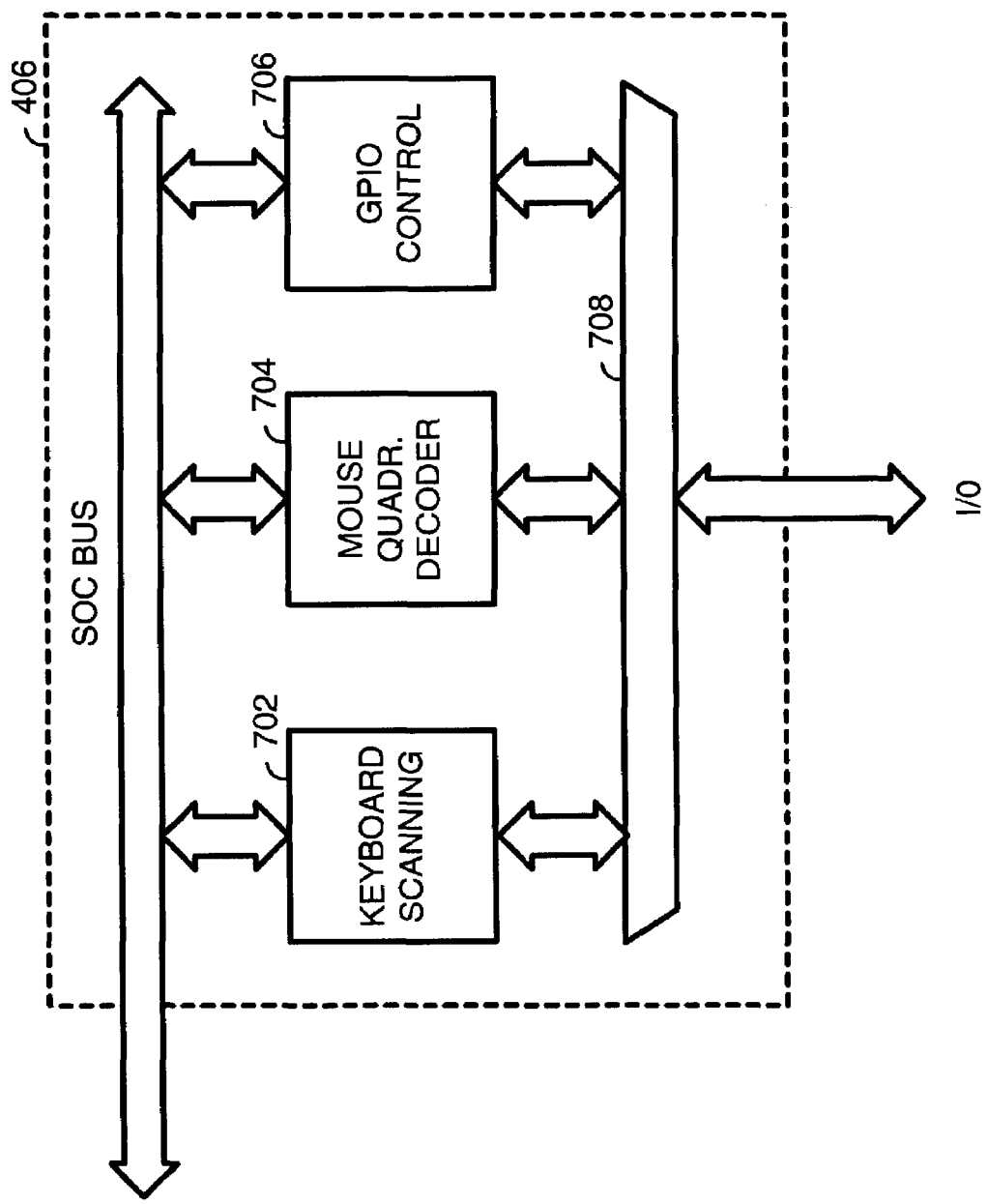
FIG. 7 is a block diagram illustrating an input/output unit of the wireless interface device of FIG. 4.

FIG. 7 is a block diagram illustrating an input/output unit 406 of the wireless interface device of FIG. 4. The input/output unit 406 includes a keyboard scanning block 702, a mouse quadrature decoder block 704, and a GPIO control block 706. Each of the keyboard scanning block 702, the mouse quadrature decoder block 704, and the GPIO control block 706 couple to the SOC bus. Further, each of the keyboard scanning block 702, the mouse quadrature decoder block 704, and the GPIO control block 706 couple to I/O via multiplexer 708. This I/O couples to the at least one user input device.

In another embodiment of the input/output unit 406, each of the keyboard scanning block 702, the mouse quadrature decoder block 704, and the GPIO control block 706 couples directly to external pins that couple to the at least one user input device.

Figure 8:
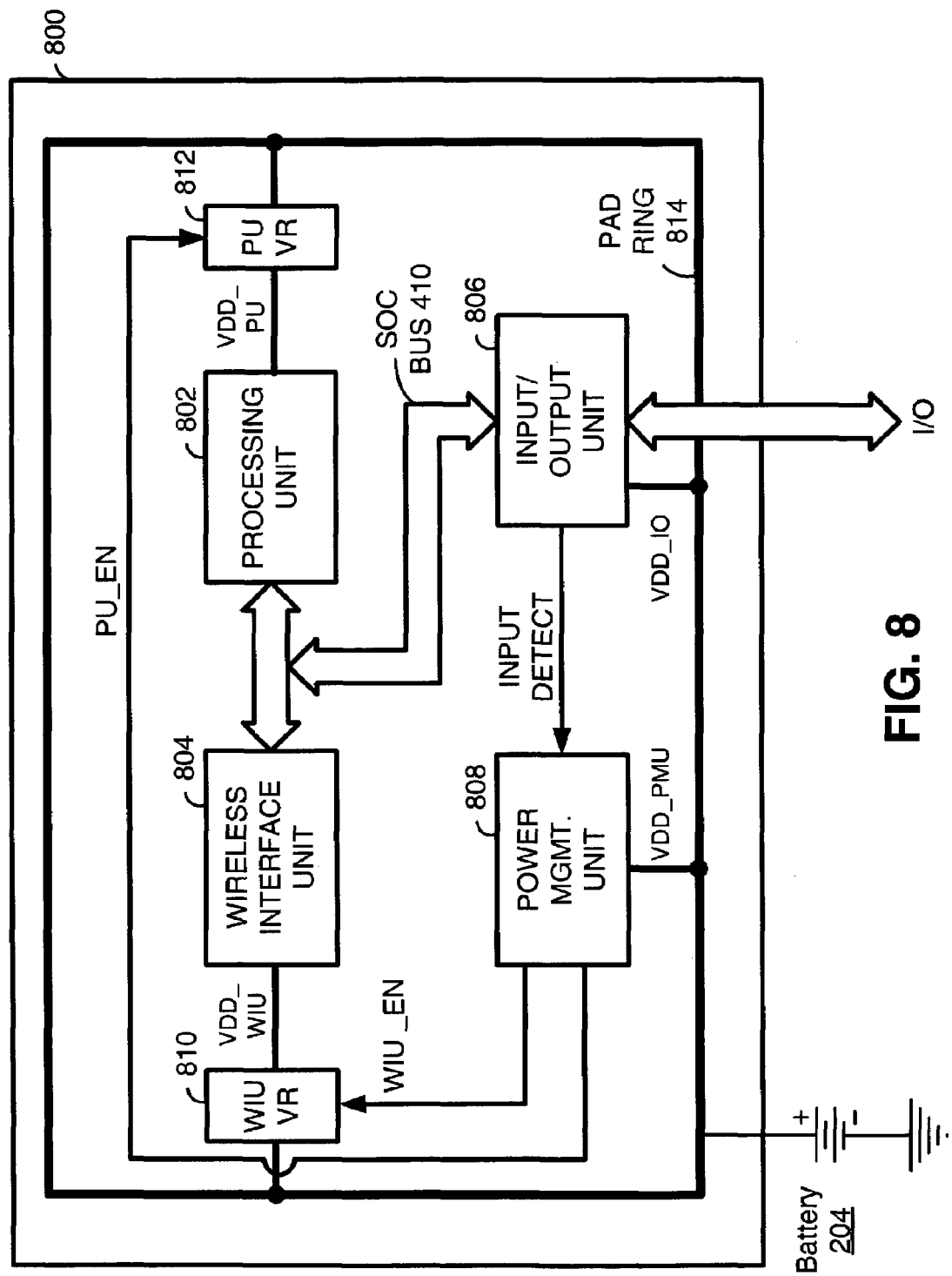
FIG. 8 is a block diagram generally showing the structure of an integrated circuit constructed according to the present invention with particular detail in the coupling of battery power to the units of the device.

FIG. 8 is a block diagram generally showing the structure of an integrated circuit constructed according to the present invention with particular detail in the coupling of battery power to the units of the device. Integrated circuit 800 of FIG. 8 includes a wireless interface unit 804, processing unit 802, input/output unit 806, and power management unit 808. The processing unit 802, wireless interface unit 804, and input/output unit 806 couple via a SOC bus 410. Further, as was previously described, input/output unit 806 couples to at least one user input device via I/O connection.

With the integrated circuit 800 of FIG. 8, a pad ring 814 surrounds a substantial portion of the components of the integrated circuit. The pad ring 814 couples directly to battery 204, which powers the pad ring. Further, input/output unit 806 and power management unit 808 couple directly to pad ring 814 to receive their power and voltage. However, processing unit 802 couples to pad ring 814 via processing unit voltage regulation circuitry 812. Further, the wireless interface unit 804 couples to pad ring 814 via wireless interface unit voltage regulation circuitry 810. The processing unit voltage regulation circuitry 812 is controlled by the power management unit 808 via control signal PU_EN. Further, the wireless interface unit voltage regulation circuitry 810 is controlled by the power management unit 808 using control signal WIU_EN.

In another embodiment, the input/output unit 806 receives power separate from the power for the processing unit 802 and wireless interface unit 804. Furthermore, the output from the processing unit voltage regulation unit 812 goes off chip 800, where it is then fed back on chip 800 via a separate pin to feed the wireless interface unit 804. The wireless interface unit contains one or more switches to switch power on and off to its own sub-circuits under control of the power management unit 808. In this embodiment, the need for wireless interface unit voltage regulation means 810 is eliminated.

In still another embodiment, an additional power source is supplied to the chip 800, which feeds the input/output buffers for the external memory interface (shown in FIG. 6). This allows the IC to interface with external devices, which may utilize different I/O voltage levels than the I/O from the input/output unit 806.

The integrated circuit operates in four different power-conserving modes: (1) busy mode; (2) idle mode; (3) suspend mode; and (4) power down mode. Busy mode, idle mode, and suspend mode are described in the HID Profile specification which is a component of the Bluetooth specification. However, power down mode is unique to the present invention.

In busy mode, the master (host computer) is actively polling the slave (HID, e.g., wireless mouse, wireless keyboard, etc.) for data at a polling rate near 100 polls/second, or about once every 16 slot times. This mode is generally implemented using the Bluetooth low-power mode known as SNIFF mode. In SNIFF mode, the master polls the slave only at given intervals specified as some even number of Bluetooth slots. This is in contrast to ACTIVE mode in which the master may poll the slave at any slot. Continued user activity (keypad strokes, mouse motion, button presses, etc.) keeps the slave in busy mode. If there has been no activity for a certain time (pre-determined by custom settings), operation transitions to idle mode.

In idle mode, the slave requests that the master (serviced host) allow it to enter SNIFF mode with a SNIFF interval that is chosen based on desired latency and average power consumption. In one operation, the SNIFF interval is 50 milliseconds (ms), or about once every 80 slot times. While in idle mode, the slave needs only to listen for polls from the master at the SNIFF intervals to maintain synchronization, and to transmit a packet periodically to the master to keep the master from timing out the slave's connection. Since the slave transmits much less often in idle mode than in busy mode, its power consumption is greatly reduced. Although the slave can wake up immediately after an event, it may have to wait up to 100 ms to transmit its data to the host, and therefore must have enough buffer space to store 100 ms of events. If an event occurs, the slave requests the master to leave SNIFF mode. If there is no further activity for a longer period, the slave transitions from idle mode to suspend mode.

When entering suspend mode, there is a brief return on the connection state to ACTIVE mode to renegotiate the SNIFF interval to the suspend interval time. In suspend mode, a SNIFF interval that is longer than the SNIFF interval used for idle mode can be used for an even lower power state. As in idle mode, any user input detected while in suspend mode will result in the slave requesting that the master allow it to be transitioned back to the busy mode. As long as the master continues transmitting (meaning the host is not turned off) the slave will remain in suspend mode. If link loss occurs due to the host being turned off without warning, or the host moving out of range, the Lost Link state will be entered.

According to the present invention, the power down mode is also supported. In the power down mode, the power management unit 808 operates the processing unit voltage regulation circuitry 812 and the wireless interface unit voltage regulation circuitry 810 to power down the processing unit 802 and wireless interface unit 804, respectively. These states of operation will be described further with reference to FIGS. 9 and 10. In the power down mode link with the host is lost.

Figure 9:
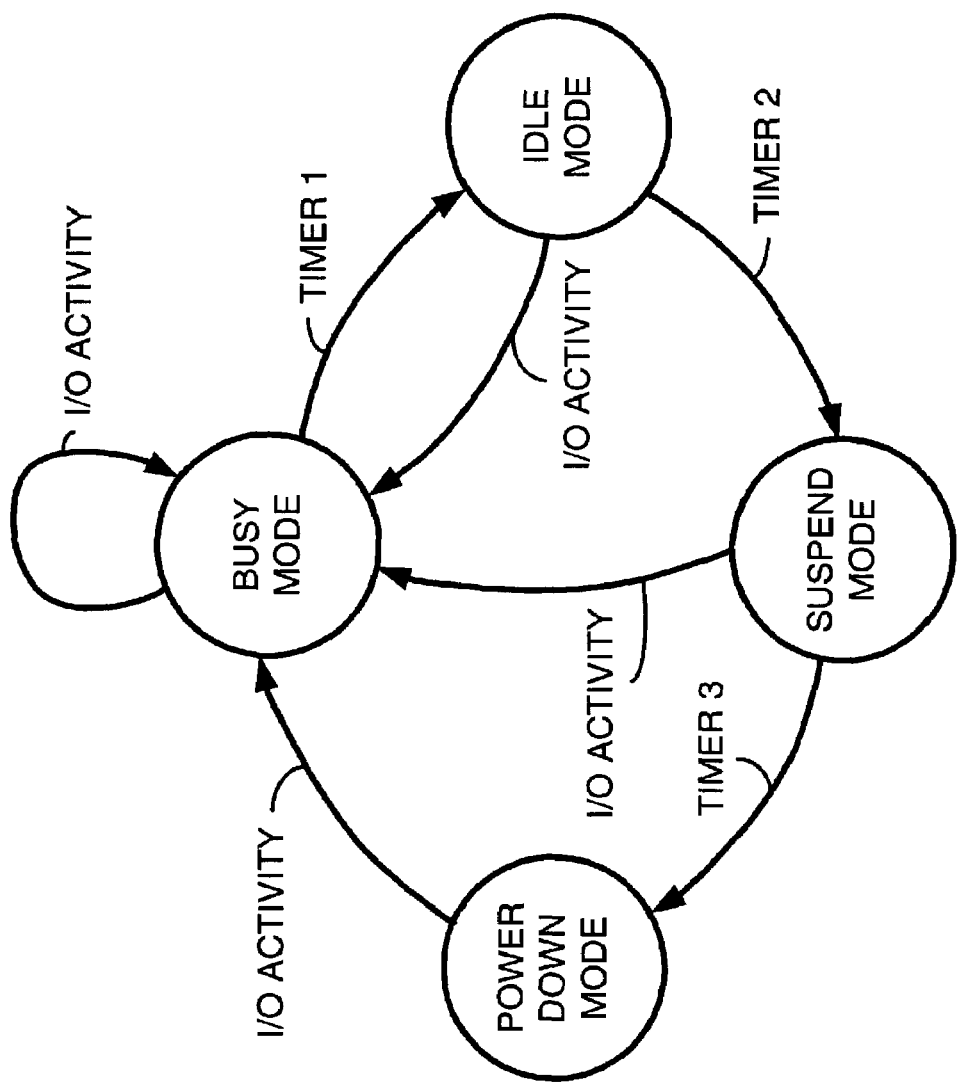
FIG. 9 is a state flow diagram illustrating operation according to the present invention.

FIG. 9 is a state flow diagram illustrating operation according to the present invention. As illustrated in FIG. 9, a wireless interface device operating according to the present invention operates in four separate power-conserving modes. These power conservation modes include the busy mode, the idle mode, the suspend mode and, the power down mode. The state diagram of FIG. 9 shows how each of these modes is reached during normal operation.

When the wireless interface device is initially powered up, it enters the busy mode of operation. In the busy mode of operation, all features and wireless operations of the wireless interface device are enabled. As long as I/O activity continues, the wireless interface device remains in the busy mode. However, after expiration of a first timer with no I/O activity, the operation moves from the busy mode to the idle mode. Operation will remain in idle mode until the expiration of a second timer or until I/O activity occurs.

If while in the idle mode I/O activity occurs, operation returns to the busy mode. If in the idle mode, if timer 2 expires with no additional I/O activity, suspend mode is entered. While in suspend mode, if I/O activity occurs, operation returns to busy mode. However, if in suspend mode, no additional I/O activity occurs until the expiration of a third timer, power down mode is entered. While in the power down mode, operation will remain in the power down mode until I/O activity occurs. When I/O activity occurs, operation of the wireless interface device will move from the power down mode to the busy mode. Upon moving from the power down mode to the busy mode, a connection with the host must be reestablished. Such reestablishment of connection is described further with reference to FIGS. 11-14.

One skilled in the art will immediately recognize that other embodiments can be realized which include fewer or more modes than those so far described. For example, in one potential embodiment, the suspend mode would not be used, and only the busy, idle, and power down modes would be implemented. In another embodiment, additional and even lower power modes than the suspend mode may be implemented which will be entered in sequence upon increasingly longer periods of input inactivity by the user following the suspend mode, and prior to entering the power down mode. In still another embodiment, the power down mode may not be implemented, and the HID device, e.g., wireless mouse or keyboard, will remain connected regardless of the duration of time during which there is no user input activity.

Figure 10:
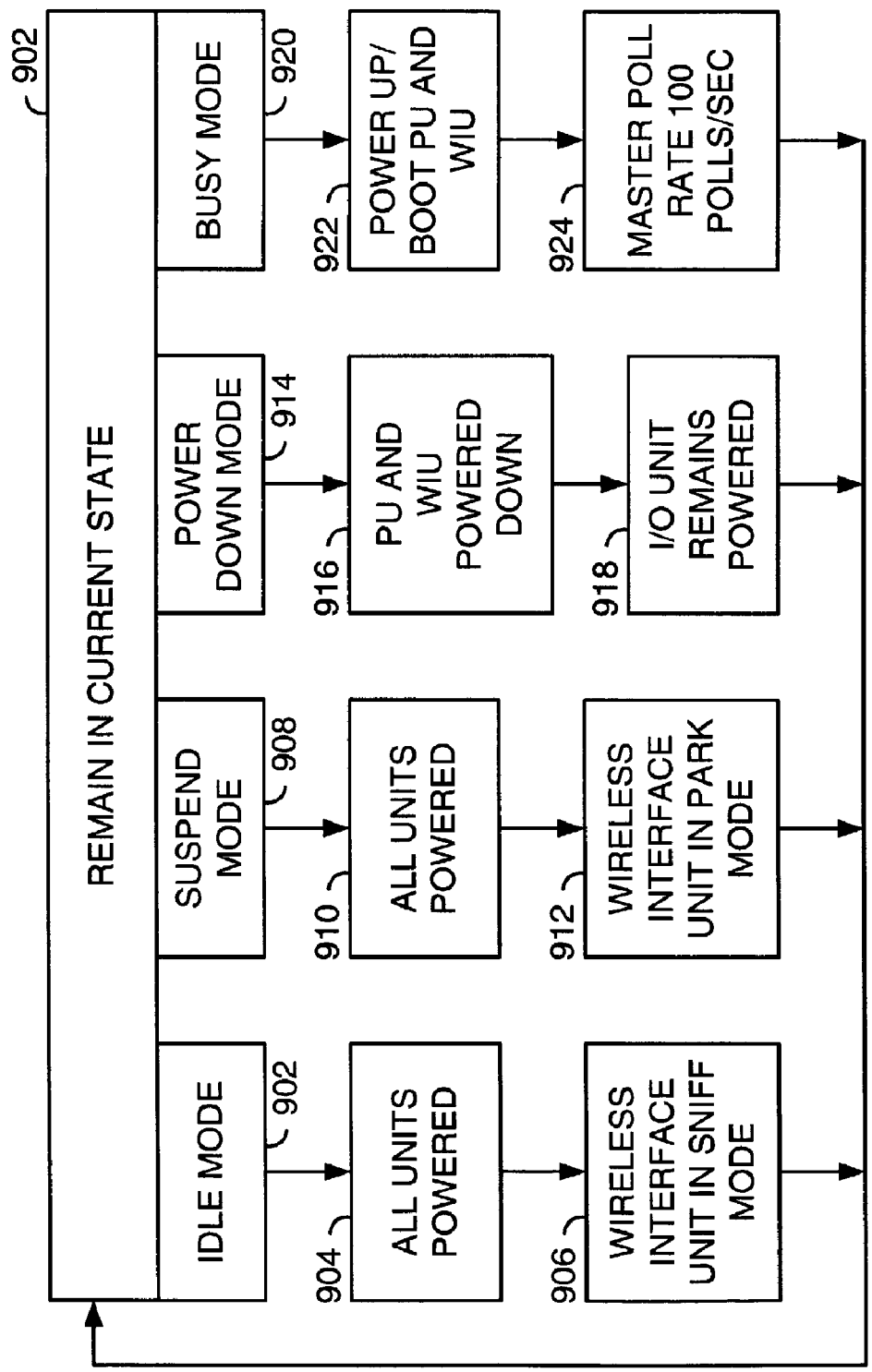
FIG. 10 is a state flow diagram illustrating operation according to the present invention in controlling the power consumption of a serviced device.

FIG. 10 is a state flow diagram illustrating operation according to the present invention in controlling the power consumption of a serviced device. As shown in FIG. 10, once operation in a particular power conservation state, e.g., busy mode, idle mode, suspend mode, and power down mode has commenced, operation will remain in that state until expiration of respective timer or I/O activity occurs (step 902).

When power conservation operation occurs to move from the busy mode to the idle mode (step 902), all portions of the wireless interface device remain powered (step 904). However, in the idle mode, the wireless interface unit enters a sniff mode in which some of its operations are reduced. Such operations were previously described with reference to FIG. 9. Further, additional information regarding this mode is available in the Bluetooth HID standard.

When the operation of the wireless interface device transitions from the idle mode to the suspend mode (step 908) all portions of the wireless interface device remain powered (step 910).

When in the suspend mode if an additional timer or inactivity period expires, the wireless interface device will transition to the power down mode (step 914). In the power down mode, the processing unit and wireless interface unit will be powered down (step 916). This power down operation will be performed in one embodiment by simply disconnecting a voltage source from the processing unit in the wireless interface unit. One such technique for doing this is described with reference to FIG. 8. In the power down mode, the I/O unit will continue to be powered into sense the state of the user input device lines.

Finally, from any of the reduced power operating states, when I/O activity is sensed by the I/O block, the wireless input device will transition back to the busy mode (step 920). When such operation occurs, if the components have been powered down, they will be a powered up and will go through their boot operations (step 922). Then, in the busy mode, the wireless interface unit will operate in its normal state in which the master wireless device, i.e., wirelessly enabled host will poll the wireless interface device at 100 times per second. From each of steps 906, 912, 918, and 924, operation returns to step 902 wherein the current power conservation state will be kept until another event occurs.

Figure 11:
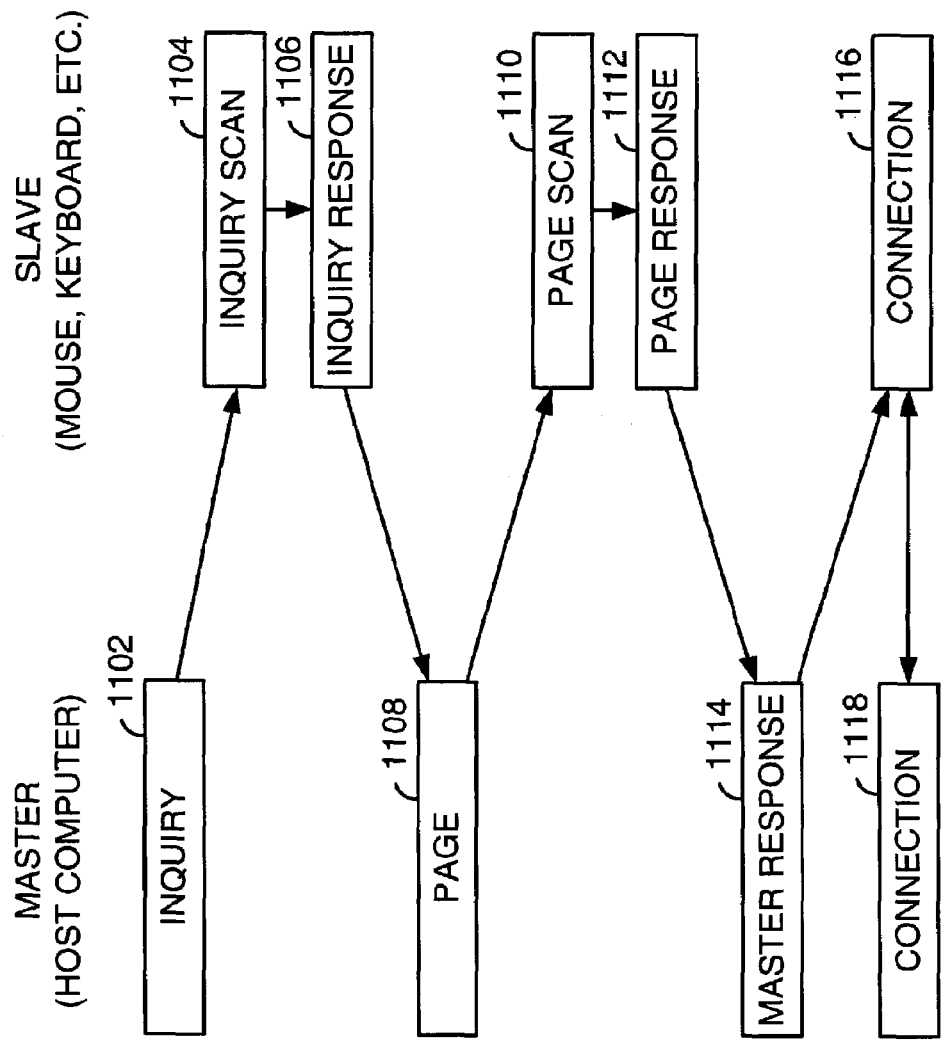
FIG. 11 is a state flow diagram illustrating the manner in which a Bluetooth master and a Bluetooth host establish a connection.

FIG. 11 is a state flow diagram illustrating the manner in which a Bluetooth master and a Bluetooth host establish a connection. A first sequence of steps in this process is the Inquiry process. The inquiry process is employed with the present invention to pair devices, e.g., mouse to host, keyboard to host, etc. The inquiry process is typically initiated manually. The Inquiry process is used by the master device to find the identity of the Bluetooth devices in its transmission/receipt range. The Inquiry process begins with the master sending out inquiry packets that include the General Inquire Access Code (GIAC) and Dedicated Inquiry Access Code (DIAC) (Inquiry state 1102). A DIAC may be used to perform a limited inquiry to inquire only devices of a certain type, e.g. peripherals such as mice and keyboards. The inquiry packets are intended to discover any Bluetooth devices operating in the range of the master. During the inquiry process, the slave device listens for the inquiry packets from the master (Inquiry scan state 1104). The slave device receives the inquiry and responds to the master by sending an address and clock information in an Frequency Hopping Synchronization packet (FHS packet) to the master (Inquiry response state 1106). After the slave responds to the master with the FHS packet, the inquiry process is complete for the particular slave. Of course, additional devices may also respond during this process. The inquiry process may be performed only once, and then the slave device is later paired with master. After pairing, the slave device can connect to the master automatically.

The master, after discovering Bluetooth devices that are in its transmission/receipt range, pages these devices (Page state 1108) for connection setup. The Page state is used by the master to activate and connect to a slave. In the page state 1108, the master sends page messages that include the intended slave's Device Access Code (DAC) one channels selected according to a page sequence (frequency hopping sequence used for paging). Further, the slave listens for page messages from the master (Page scan state 1110). In the Page scan state the slave listens on a particular frequency for a page message transmitted by the master that includes the slave's device access code (DAC). The slave, in the Page scan state, if paged by the master, responds (Page response state 1112) in a page response message that includes its DAC. The master, after receiving the page response from the slave, responds by transmitting the master's real time clock, master's BD_ADDR, the BCH parity bits and the class of the device in a FHS packet (Master response state 1114). After the slave has received the FHS packet, connection states are entered by both the master and the slave at steps 1118 and 1120, respectively.

According to the Bluetooth Specification, when in the Page state 1110, the master transmits on a page hopping sequence to that includes 32 frequencies. Each of these 32 frequencies is calculated using the paged unit's Bluetooth Device Address BD_ADDR. The phase of the page hopping sequence is derived from an estimate of the clock of the unit being paged. If an inquiry has recently been performed, or the two devices have recently communicated, the paging device should be able to theoretically calculate the predicated hop frequency of the unit being paged. Inevitably, however, clock drift occurs. In addition, if the devices are paired, but have not been connected recently, the paging device then has no knowledge as to the phase of the paged device's hop frequency sequence. In order to address this difficulty, the paging sequence includes the 32 frequencies, using a calculated main center frequency and 31 other frequencies, these other frequencies having offset of +/−16. A new center frequency is calculated every 1.28 s. To handle all 32 frequencies of the 32 frequencies of the paging sequence, the page hopping sequence switches alternates between two paging trains of 16 frequencies each. These trains are referred to as the A train and the B train. When in the page state, the master transmits the A train 128 times in succession. Then, if the slave has not responded to the page after 128 transmissions of the A train, the master transmits the B train 128 times in succession. If the slave does not respond to the B train, the master again transmits the A train. This operation continues until the slave responds or until the master gives up.

According to the Bluetooth Specification, in the Inquiry scan state 1104, the slave is to listen for pages in one of three different modes. In a first operation, the slave determines the 32 frequencies of the page hopping sequence. Then, the slave enters one of three modes, R0, R1, and R2. In the R0 mode, the slave tunes its receiver to a selected one of the frequencies of the page hopping sequence. The slave then monitors the frequency for 1.28 seconds. 1.28 seconds is equal to 16 (number of frequencies in page hopping sequence train)*128 (number of times the train is transmitted)*625 μs (slot duration of Bluetooth transmission). If the slave does not receive the page after the 1.28 second interval, the slave tunes its receiver to a second frequency of the 32 frequencies of the page hopping sequence and listens for a page on that frequency. Because the Bluetooth Specification supports operation in the Industrial, Scientific, and Medical frequency band, nominally the 2.4 GHz band, significant narrow band interference may be present. Should narrow band interference be present on the frequency of the slave, the slave will not receive the master's page. Thus, if the slave does not receive the page, the slave will retune its receiver to another frequency of the page hopping frequencies and listen for a page. The slave will repeat this process until it receives the master's page or until it gives up.

In the R1 mode, a reduced power mode, the slave tunes its receiver to the selected frequency for the 1.28 second period, but then actively listens for less than 1.28 seconds. In the most typical implementation, the slave only actively listens for 11.25 ms. During the remainder of the 1.28 second period, the slave's receiver is idle to conserve power. 11.25 ms is equal to the duration in time of 18 Bluetooth slots, 18*625 μs. While the page hopping sequence only includes 16 Bluetooth slots, the receive listens for 18 slots to compensate for timing misalignment. In the R2 mode, another reduced power mode, the slave tunes its receiver to the selected frequency for a period of 2.56 seconds in duration. However, during this period of time, the slave only actively listens for 11.25 ms or more, but less than 2.56 seconds. 11.25 ms is the typical listening time for most implementations. Thus, in any of these Page scan modes, modes R0, R1, and R2, the slave may not establish a connection with the master for a number of seconds. In general, the time windows during which the slave will receive the master's page will be spaced seconds apart. If interference causes one of these windows to be missed, the next opportunity may not come around for several more seconds. This amount of delay is unacceptable when the slave is servicing a HID, such as a wireless keyboard, wireless mouse, or other input device.

Operation according to the present invention therefore concerns establishing a connection between the host and the slave via paging operations at steps 1108, 1110, and/or 1114 that allow the master and slave to establish a connection in a significantly reduced period. These operations correspond to the slave transitioning from the power down mode to the busy mode in FIG. 9.

According to a first embodiment of the present invention, the master and the slave interact during initial inquiry to establish a subset of the page hopping sequence ("modified page hopping sequence"). This initial inquiry may be performed at the factory when the slave(s) is/are initially paired with the host. Alternately, this inquiry process may occur when a user pairs the devices after purchase. In one particular embodiment of the present invention, the modified page hopping sequence includes 16 frequencies. These 16 frequencies may be a subset of the hopping sequence determined according to the Bluetooth Specification. However, the modified page hopping sequence may be determined in another fashion as well. Additionally, the modified page hopping sequence may include differing numbers of frequencies, as contrasted to 16 frequencies.

According to a second aspect of the present invention, instead of "camping" on a single frequency for 1.28 seconds while in the Page scan state 1112, the slave transitions between frequencies every 10 ms. 10 ms corresponds to the period of time during which the master transmits on 16 frequencies of either the A train or B train of the hopping sequence or the 16 frequencies of the modified page hopping sequence.

FIG. 12A is a timing diagram illustrating master page operations according to the present invention. According to standardized Bluetooth operations, a master device pages those slaves that were coupled during the inquiry process. With regard to the present invention, the PC host 106 (master) of FIGS. 1A and 1B during an inquiry process were coupled with the wireless mouse and/or the wireless keyboard 108 (slaves). When master is not servicing an active connection with a slave, it will page the slave(s) to which it was paired in the Inquiry process. When paging a slave, the master transmits pages according to page hopping sequence. In a paging operation according to the Bluetooth specification, the master transmits pages in succession on the frequencies of the A train and the B train (as was previously described).

As illustrated, the master transmits pages according to the page hopping sequence during a 16 slot (10 ms) train. In the train illustrated, the master transmits on two different frequencies of a corresponding A train, B train, or modified page hopping sequence, in each of slots 1, 3, 5, 7, 9, 11, 13, and 15. Then, in slots 2, 4, 6, 8, 10, 12, 14, and 16, the master listens for a response from the paged slave. Recall that the page includes the intended slave's DAC. The frequency to which the master tunes in attempting to receive a response from the slave in slots 2, 4, 6, 8, 10, 12, 14, and 16 is determined by the Bluetooth Specification.

According to one embodiment of the present invention, the master transmits pages according to the Bluetooth Specification. In such case, the master transmits the A train 128 times in succession. Then, if the slave has not responded to the page after 128 transmissions of the A train, the master transmits the B train 128 times in succession. If the slave does not respond to the B train, the master again transmits the A train. This operation continues until the slave responds or until the master gives up.

According to a second embodiment of the present invention, the master and slave agree upon a modified page hopping sequence during the inquiry process. One example of the modified page hopping sequence is a single sequence of 16 frequencies. In the second embodiment therefore, the master transmits the 16 frequency modified page hopping sequence repeatedly during corresponding paging operations until the slave responds or until the master gives up. This single sequence of 16 frequencies could be the A train, the B train, or another 16 frequency train. Further, the modified page hopping sequence could be a number of frequencies other than 16.

According to a third embodiment of the present invention, the host transceiver may already be connected to a first HID, while a second HID attempts to make a connection. In this scenario, the host transceiver places the first connected slave into a Sniff mode with an interval which is 18 slots or longer (11.25 ms or greater). The host transceiver then performs page-scanning in between the Sniff slots used to communicate with the first slave and gives the second HID many windows of opportunity for its page messages to be received. In general the host transceiver is the master, though in making the connection the second HID is temporarily a master, but then becomes a slave to the host transceiver by performing a role-switch operation.

FIG. 12B is a timing diagram illustrating slave page operations according to the present invention. As contrasted to the Bluetooth Specification slave page operations described above, in slave paging operations of the present invention, the slave camps on a single frequency (of the page hopping sequence or modified page hopping sequence) for a page scanning period that differs from the 1.28 second period defined by the Bluetooth Specification. The single frequency upon which the slave camps during each page scanning period is one of the A train, the B train, or the modified page hopping sequence, depending upon the operation. Then, after the page scanning period has been completed (16 slots, 10 ms), the slave tunes to a next frequency of the A train, the B train, or the modified page hopping sequence. After the slave has cycled through each of a series of frequencies, the slave repeats the series of frequencies.

According to the present invention, should a narrowband interferer be present when the slave listens to the first frequency, when the slave moves to a second frequency it should detect the page from the master. With Bluetooth Specification operations, this operation would take anywhere from 1.28 seconds or 2.56 seconds. With the page scanning operations of the present invention, the slave will receive the pages and respond thereto in a period that will typically take at most 10 to 20 ms.

The page scanning period of FIG. 12B will typically not correspond to the boundaries of the transmission page hopping sequence (or modified page hopping sequence) of the master because of mismatch between the master's clock and the slave's clock even though such correspondence is shown in FIG. 12B for simplicity in description. However, since the page scanning period extends for the duration of the page hopping sequence (or modified page hopping sequence) of the master, the slave should hear a page on the camped frequency if one is transmitted. Such is the case because the master repeats the page hopping sequence (or modified page hopping sequence.

While FIG. 12B illustrates operation in which the page scanning period corresponds directly to a duration of the page hopping sequence or the modified page hopping sequence, in another embodiment the page scanning period extends for an integer multiple of the duration of the page hopping sequence or the modified page hopping sequence. In such case, for example, the slave would listen on $F_2$ for a page scanning period that corresponds to an integer multiple (two or more) of the duration of the page hopping sequence (or modified page hopping sequence). However, the duration of the page scanning period must be relatively small as compared to the 1.28 second period defined by the Bluetooth Specification to provide the benefits described herein.

Figure 13:
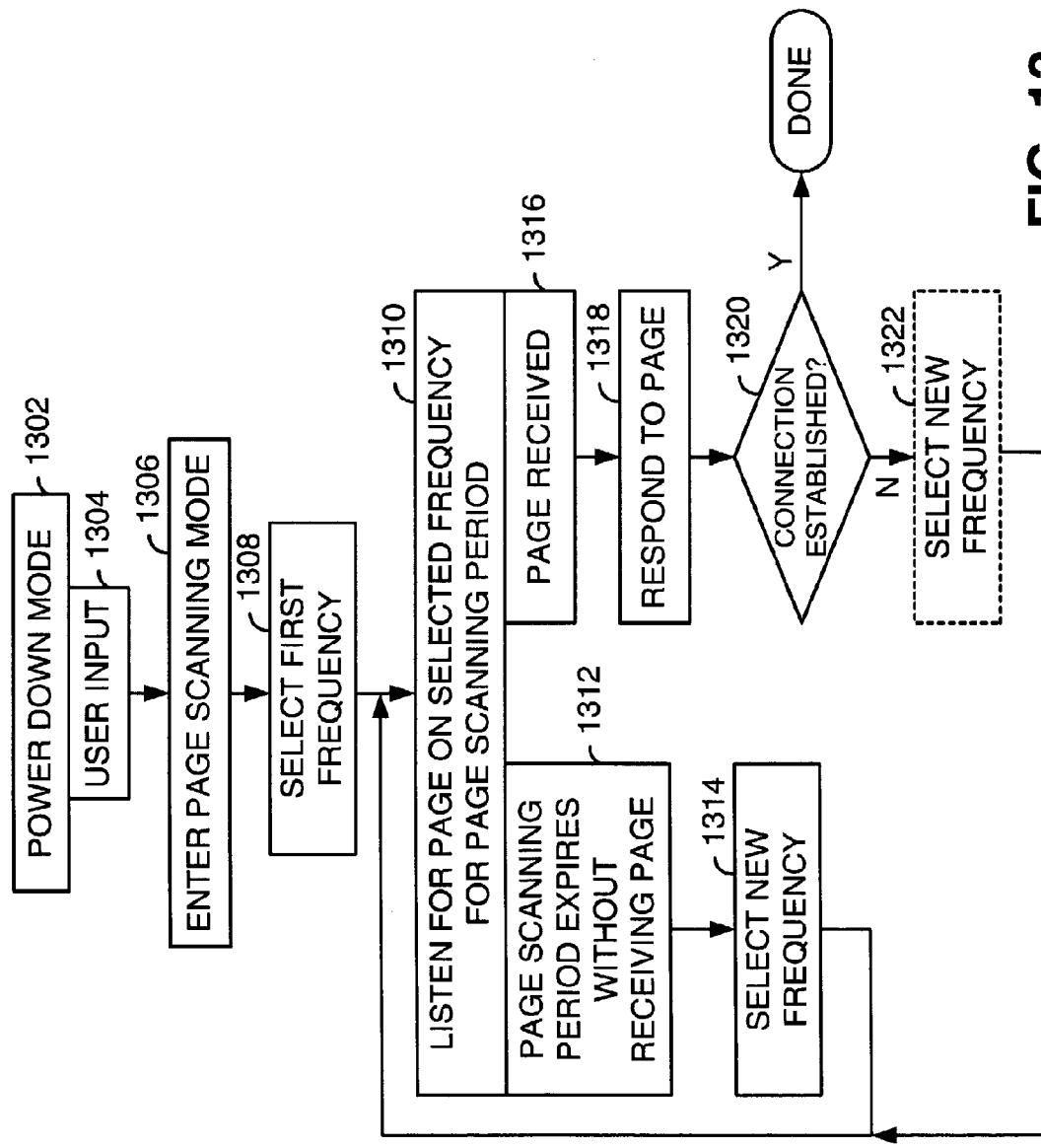
FIG. 13 is a state flow diagram illustrating paging operations according to the present invention.

FIG. 13 is a state flow diagram illustrating paging operations according to the present invention. Operation commences with the slave (wireless interface device 400, e.g., mouse, keyboard, etc.) in the power down mode (step 1302). As was previously described, in the power down mode, the wireless interface unit 404 and processor 402 of the wireless interface device 400 are not powered. Further, in the power down mode no connection exists between the slave and its servicing master. However, when the wireless interface device 400 receives user input (step 1304), the wireless interface device 400 moves from the power down mode to the busy mode. During these operations, the slave seeks to establish a connection with the master.

In attempting to establish a connection with the master, the slave enters page scanning mode (step 1306). In page scanning mode, the slave selects a first frequency of a scanning sequence that includes the frequencies of the A train, the B train, or the modified page hopping sequence (step 1308). The slave, via its wireless interface unit 404, then listens for a page on the selected frequency (step 1310). The slave camps on the selected frequency for a page scanning period. The page scanning period may correspondingly exactly to the duration of the A train, the B train, or the modified page hopping sequence, e.g., 10 ms. However, the page scanning period may also correspond to an integer multiple (two or more) of the duration of the page hopping sequence (or modified page hopping sequence)

If the slave receives a page during this period (step 1316), the slave responds to the page (step 1318). If a connection is established, as determined at step 1320, the paging operations are completed. However, if a connection is not established, as determined at step 1320, the slave may select a new frequency (step 1322) and operation returns to step 1310. If the page scanning period expires without detecting a page from the master (step 1312), the slave selects a new frequency (step 1314) and listens on the new selected frequency for the master's page (step 1310).

In FIG. 13 it is assumed that the "slave" is the HID, which enters page-scan after some user activity occurs while the device is in the PowerDown mode. Operation of the present invention also supports the reverse of this operation. In such case, upon user activity, the HID begins paging and assumes that the host transceiver is actively listening either in page-scan R0, or that the host transceiver is in-between Sniff intervals if another HID is already connected. This particular operation is a preferred approach at boot-up. To allow a user to reach a PC BIOS set-up screen, it is necessary to allow the user to quickly enter keystrokes from the serviced keyboard. Thus, in such case, the host transceiver immediately enters Page-Scan R0 at system boot, which causes the keyboard to be connected rapidly, well before the BIOS screen disappears from view. This operation thus allows the user to interface with the PC BIOS before an Operating System is brought up.

Figure 14:
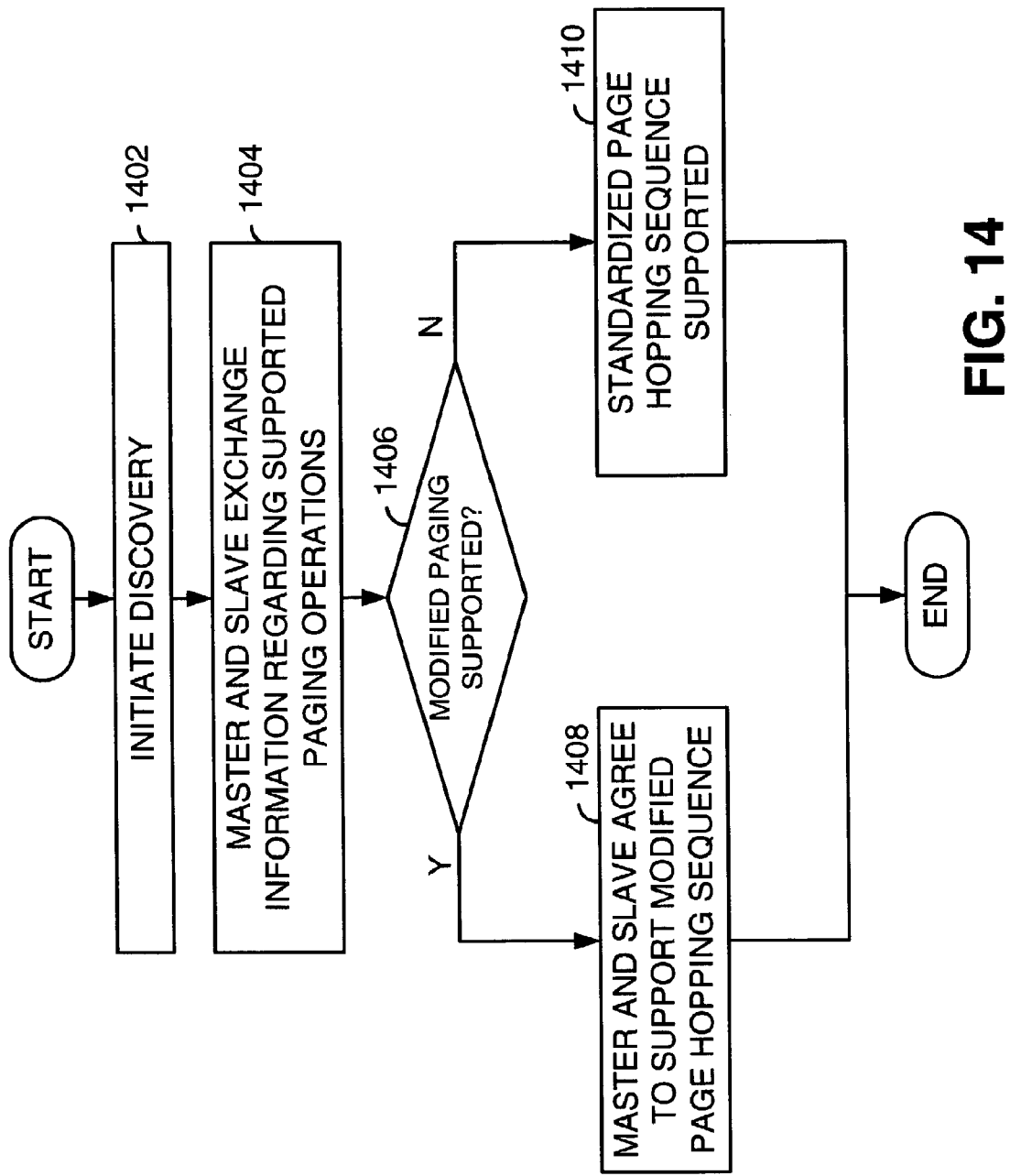
FIG. 14 is a state flow diagram illustrating inquiry operations according to the present invention.

FIG. 14 is a state flow diagram illustrating inquiry operations according to the present invention. As was previously described herein, a modified page hopping sequence may be established for paging operations according to the present invention. However, the modified page hopping sequence may conflict with Bluetooth Specification standardized operations. The operation of FIG. 14 illustrates one manner in which a master and a slave may establish a modified page hopping sequence.

Operation commences wherein the master initiates discovery operations (step 1402) as have been previously described with reference to FIG. 11. The discovery process may occur at the factory when a wireless mouse and/or wireless keyboard is/are bonded to a particular host computer. The discovery process may also be initiated by a user or an administrator during an installation process. In either case, when discovery is initiated, the master and slave exchange information regarding supported paging operations (step 1404) among other exchanged information. Based upon this exchange of information, the master and slave determine whether modified paging operations are supported (step 1406). If modified paging operations are supported, the master and slave agree to support a modified page hopping sequence (step 1408). If modified paging operations are not supported by both the master and the slave (as determined at step 1406), a standardized page hopping sequence is employed by the master when paging the slave (step 1410).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (for example, an item includes, but is not limited to, a component, an element, a circuit, and/or a module) where, for indirect coupling, the intervening item does not modify the information of a signal but may adjust its current level, voltage level, and/or power level. As may further be used herein, inferred coupling (that is, where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that a first signal has a greater magnitude than second signal, a favorable comparison may be achieved when the magnitude of the first signal is greater than that of the second signal or when the magnitude of the second signal is less than that of the first signal.

What is claimed is:

1. A method for operating a wireless Human Interface Device (HID) to conserve battery life during a link reestablishment attempt, the method comprising:
    establishing a wireless connection with a host device;
    receiving user input and wirelessly transmitting the user input to the host device;
    after a period of time during which no user input is received, entering a power down mode in which the connection with the host device is lost;
    after the connection with the host device has been lost, receiving user input;
    attempting to reestablish a link with the host device by page scanning a plurality of frequencies of a page hopping sequence, wherein the page scanning includes a reduced period to expedite the link reestablishment attempt; and
    when a page is received from the host device, establishing a wireless connection with the host device.

2. The method of claim 1, wherein page scanning a plurality of frequencies of a page hopping sequence comprises:
    listening for pages from the host device on a first frequency of a page hopping sequence of the host device for a page scanning period that corresponds to a duration of the page hopping sequence; and
    listening for pages from the host device on a second frequency of the page hopping sequence of the host device for the page scanning period that corresponds to the duration of the page hopping sequence.

3. The method of claim 2, further comprising interacting with the host device to determine the page hopping sequence.

4. The method of claim 1, wherein the page hopping sequence is determined according to a Bluetooth Specification.

5. The method of claim 1, wherein the page hopping sequence differs from a specified page hopping sequence determined according to a Bluetooth Specification.

6. The method of claim 2, wherein the page scanning period is equal to the duration of the page hopping sequence.

7. The method of claim 2, wherein the page scanning period is equal to an integer multiple of the duration of the page hopping sequence.

8. The method of claim 1, wherein page scanning further comprises:
    interfacing with the host device during an inquiry process to determine the page hopping sequence.

9. The method of claim 8, wherein the page hopping sequence differs from a specified page hopping sequence determined according to a Bluetooth Specification.

10. An integrated circuit that services communications between a wirelessly enabled host and at least one user input device, the wireless interface device comprising:
    a wireless interface unit that wirelessly interfaces with the host, wherein the wireless interface unit supports paging operations;
    a processing unit coupled to the wireless interface unit; and
    an input/output unit coupled to the wireless interface unit and to the processing unit, wherein the input/output unit also couples to the at least one user input device;
    wherein the processing unit functions to:
        establish a wireless connection with the wirelessly enabled host;
        receive user input and wirelessly transmitting the user input to the wirelessly enabled host;
        after a period of time during which no user input is received, enter a power down mode in which the connection with the host is lost;
        after the connection with the host has been lost, receive user input;
        attempt to reestablish a link with the host by page scanning a plurality of frequencies of a page hopping sequence, wherein the page scanning includes a reduced period to expedite the link reestablishment attempt; and
        when a page is received from the host, establish a wireless connection with the host.

11. The integrated circuit of claim 10, wherein the processing unit functions to page scan a plurality of frequencies of a page hopping sequence by:
    listening for pages from the host on a first frequency of a page hopping sequence of the host for a page scanning period that corresponds to a duration of the page hopping sequence; and
    listening for pages from the host on a second frequency of the page hopping sequence of the host for a page scanning period that corresponds to a duration of the page hopping sequence.

12. The integrated circuit of claim 11, wherein the processing unit further functions to interact with the host to determine the page hopping sequence.

13. The integrated circuit of claim 10, wherein the page hopping sequence is determined according to a Bluetooth Specification.

14. The integrated circuit of claim 10, wherein the page hopping sequence differs from a specified page hopping sequence determined according to a Bluetooth Specification.

15. The integrated circuit of claim 11, wherein the page scanning period is equal to the duration of the page hopping sequence.

16. The integrated circuit of claim 11, wherein the page scanning period is equal to an integer multiple of the duration of the page hopping sequence.

17. The integrated circuit of claim 10, wherein the processing unit further functions to page scan by:
    interfacing with the host device during an inquiry process to determine the page hopping sequence.

18. The integrated circuit of claim 17, wherein the page hopping sequence differs from a specified page hopping sequence determined according to a Bluetooth Specification.

* * * * *